(12) United States Patent
Thompson

(10) Patent No.: US 7,415,794 B1
(45) Date of Patent: Aug. 26, 2008

(54) PORTABLE COOLER AND TACKLE BOX

(76) Inventor: Scott M. Thompson, 11489 Almazon St., San Diego, CA (US) 92129

( * ) Notice: Subject to any disclaimer, the term of this patent is extended or adjusted under 35 U.S.C. 154(b) by 0 days.

(21) Appl. No.: 11/692,420

(22) Filed: Mar. 28, 2007

(51) Int. Cl.
A01K 97/06 (2006.01)

(52) U.S. Cl. .................. 43/54.1; 206/315.11; 62/457.1; 62/457.7

(58) Field of Classification Search ............ 43/54.1, 43/55–57, 21.2; 206/315.11; 224/920, 922; 62/457.1, 457.7
See application file for complete search history.

(56) References Cited

U.S. PATENT DOCUMENTS

| | | | | | |
|---|---|---|---|---|---|
| 1,929,833 | A | * | 10/1933 | Van Vuren | 43/54.1 |
| 2,152,346 | A | * | 3/1939 | Dickson | 43/54.1 |
| 2,153,549 | A | * | 4/1939 | Cooper | 43/54.1 |
| 2,555,073 | A | * | 5/1951 | Zdankoski | 43/55 |
| 2,717,391 | A | * | 9/1955 | Bracken | 43/54.1 |
| 2,823,971 | A | * | 2/1958 | Hoyt | 43/54.1 |
| 3,062,421 | A | * | 11/1962 | Fleming | 43/55 |
| 3,282,482 | A | * | 11/1966 | Scharsu | 224/922 |
| 3,350,810 | A | * | 11/1967 | Warner et al. | 206/315.11 |
| 3,399,939 | A | * | 9/1968 | Anderson | 206/315.11 |
| 3,780,468 | A | * | 12/1973 | Maffett | 43/54.1 |
| 3,835,575 | A | * | 9/1974 | Kelley et al. | 43/57 |
| 3,947,991 | A | * | 4/1976 | Morcom | 43/54.1 |
| 3,958,359 | A | * | 5/1976 | Doughty | 43/55 |
| 4,023,304 | A | * | 5/1977 | Singer | 43/54.1 |
| 4,033,066 | A | * | 7/1977 | Morcom | 43/54.1 |
| 4,128,170 | A | * | 12/1978 | Elliott | 43/54.1 |
| 4,245,422 | A | * | 1/1981 | Souza | 206/315.11 |
| 4,353,182 | A | * | 10/1982 | Junkas et al. | 43/55 |
| 4,467,551 | A | * | 8/1984 | Pulver | 43/54.1 |
| 4,541,539 | A | * | 9/1985 | Matthews | 43/26 |
| 4,739,577 | A | * | 4/1988 | Lanius | 43/54.1 |
| 4,782,619 | A | * | 11/1988 | Richards | 43/54.1 |
| 4,841,661 | A | * | 6/1989 | Moore | 43/54.1 |
| 4,884,360 | A | * | 12/1989 | Pearcy | 43/54.1 |
| 5,079,863 | A | * | 1/1992 | Gillespie | 43/54.1 |
| 5,092,263 | A | * | 3/1992 | Hutchison et al. | 43/55 |
| 5,123,197 | A | * | 6/1992 | Gentry et al. | 43/54.1 |
| 5,125,183 | A | * | 6/1992 | Tisdell | 43/56 |
| D328,550 | S | * | 8/1992 | Mogil et al. | D7/605 |
| 5,176,281 | A | * | 1/1993 | Fiore | 206/315.11 |
| 5,407,218 | A | * | 4/1995 | Jackson | 62/457.7 |
| 5,426,885 | A | * | 6/1995 | Wittman | 43/54.1 |
| 5,605,056 | A | * | 2/1997 | Brown et al. | 43/55 |
| 5,660,310 | A | * | 8/1997 | LeGrow | 62/457.1 |
| 5,797,528 | A | * | 8/1998 | McDuffie | 62/457.7 |

(Continued)

FOREIGN PATENT DOCUMENTS

EP        388617 A1 * 9/1990

(Continued)

*Primary Examiner*—Darren W Ark

(57) ABSTRACT

A portable cooler and tackle box provided in sizes from about 5 gallon to about 60 gallon capacity with at least one wheel affixed on or proximally to the bottom and at least one handle affixed exteriorly, and insulation, and a pivotally attached cover. Aprons are removably attached to the exterior and are fitted with pockets, holders, and pouches for holding accessories, and at least one horizontal partition wall is within the main body. At least one tray is slideably contained within the lower interior. The main body interior may contain at least one permanent or removable compartment.

4 Claims, 5 Drawing Sheets

U.S. PATENT DOCUMENTS

| | | | | |
|---|---|---|---|---|
| 5,864,981 | A | * | 2/1999 | Zeman .......................... 43/57 |
| 5,941,015 | A | * | 8/1999 | Jenkins ....................... 43/54.1 |
| 5,950,352 | A | * | 9/1999 | Volmer ....................... 43/54.1 |
| 5,992,806 | A | * | 11/1999 | Adams .......................... 43/57 |
| 6,105,844 | A | * | 8/2000 | Walters et al. ............. 62/457.7 |
| 6,193,062 | B1 | * | 2/2001 | Rysgaard et al. ............ 43/54.1 |
| 6,247,328 | B1 | * | 6/2001 | Mogil ....................... 62/457.7 |
| 6,357,252 | B1 | * | 3/2002 | Rand ........................ 62/457.7 |
| 6,446,382 | B1 | * | 9/2002 | Cloutier et al. ............. 43/54.1 |
| 6,474,097 | B2 | * | 11/2002 | Treppedi et al. ........... 62/457.7 |
| 6,487,814 | B1 | * | 12/2002 | Arredondo et al. ........... 43/54.1 |
| 6,609,626 | B2 | * | 8/2003 | Young et al. ........... 220/592.03 |
| 6,691,451 | B1 | * | 2/2004 | Keenan ......................... 43/55 |
| 6,938,761 | B2 | * | 9/2005 | Nish ....................... 206/315.11 |
| 6,993,931 | B1 | * | 2/2006 | Hamilton ................... 62/457.7 |
| 7,013,671 | B1 | * | 3/2006 | Bolda ........................ 62/457.7 |
| 7,155,859 | B1 | * | 1/2007 | Brooks ........................ 43/54.1 |
| 7,162,890 | B2 | * | 1/2007 | Mogil et al. ............... 62/457.7 |
| 7,188,491 | B2 | * | 3/2007 | Donald et al. .............. 62/457.7 |
| 2004/0035143 | A1 | * | 2/2004 | Mogil ....................... 62/457.7 |
| 2005/0050791 | A1 | * | 3/2005 | Placek ........................ 43/54.1 |
| 2006/0218963 | A1 | * | 10/2006 | Elias ........................ 62/457.1 |
| 2006/0236589 | A1 | * | 10/2006 | Boyette et al. .................. 43/55 |
| 2006/0288730 | A1 | * | 12/2006 | Shill ......................... 62/457.7 |
| 2007/0051031 | A1 | * | 3/2007 | Allen .......................... 43/57 |
| 2007/0119093 | A1 | * | 5/2007 | Jaskulski .................... 43/54.1 |

FOREIGN PATENT DOCUMENTS

| | | | |
|---|---|---|---|
| EP | 1495677 A1 | * | 1/2005 |
| FR | 2569948 A1 | * | 3/1986 |
| FR | 2704725 A1 | * | 11/1994 |
| FR | 2898464 A1 | * | 9/2007 |
| GB | 2278032 A | * | 11/1994 |
| JP | 09154464 A | * | 6/1997 |
| JP | 10243763 A | * | 9/1998 |
| JP | 10329058 A | * | 12/1998 |
| JP | 11155451 A | * | 6/1999 |
| JP | 2000032892 A | * | 2/2000 |
| JP | 2001120144 A | * | 5/2001 |
| JP | 2001218545 A | * | 8/2001 |
| JP | 2002218885 A | * | 8/2002 |
| JP | 2002218887 A | * | 8/2002 |
| WO | WO 2006078160 A1 | * | 7/2006 |

* cited by examiner

PORTABLE COOLER AND TACKLE BOX

BACKGROUND OF THE INVENTION

1. Field of the Invention

This invention relates to portable coolers and tackle boxes and more specifically to a portable cooler that is also a fisherman's tackle box.

2. Description of the Prior Art

Prior art teaches various devices for attempting to accommodate a fisherman's needs in tackle boxes and coolers. For example, U.S. Pat. No. 5,864,981 to Zeman discloses a combination tackle box/cooler/storage container. The device does not provide for as many varied partitions and storage aids as does the present invention, nor does it provide for the variety in sizing of the present invention, nor the mobility.

U.S. Pat. No. 4,541,539 to Matthews discloses a composite support system for fishermen. The system, though, provides a detachable tackle box and does not provide wheels for transport. U.S. Pat. No. 4,128,170 to Elliott discloses a cooler, which contains latching means for attaching a tackle box. The design of the device differs substantially from the present invention. While the above-described devices fulfill their respective and particular objects and requirements, they do not describe a portable cooler and tackle box that provides for the advantages of the present invention. Therefore, a need exists for an improved portable cooler and tackle box, particularly one that includes the advantages of the present invention. In this respect, the present invention substantially departs from the conventional concepts and designs of the prior art.

SUMMARY OF THE INVENTION

In view of the foregoing disadvantages inherent in the known types of coolers and tackle boxes now present in the prior art, the improved portable cooler and tackle box overcomes the above-mentioned disadvantages and drawbacks or the prior art. As such, the general purpose of the portable cooler and tackle box, described subsequently in greater detail, is to provide a portable cooler and tackle box which has all of the advantages of the prior art mentioned heretofore and many novel features that result in an improved portable cooler and tackle box which is not anticipated, rendered obvious, suggested, or even implied by the prior art, either alone or in combination thereof.

To accomplish this, the portable cooler and tackle box comprises a device for storing and transporting support equipment needed in fishing. In combining a cooler and fishing equipment storage, the portable cooler and tackle box is to be manufactured in a plurality of embodiments and sizes that can accommodate most fishermen. Sizes may range from 5 gal capacity to 60 gallons in capacity. One embodiment comprises a typically shaped rectangular cooler with hinged lid and an interior for holding ice, food, drink, or even fish and/or bait. Additionally, a removably inserted tackle box fits within and occupies a portion of the interior of the cooler. On the exterior vertical sides of the portable cooler and tackle box are removably attached aprons. The aprons are made of durable plastic fabric, canvas, vinyl, nylon, or any such applicable flexible and durable cloth or combinations or these fabrics. The aprons attach via snaps or hook and loop fabric, or hooks and eyelets. Aprons are utilized for storing the many items needed by fishermen. In a further embodiment, the aprons are combined to form one continuously surrounding apron. Appropriately sized pockets are provided for items such as fish filet knife, diagonal cutters, needle-nosed pliers, and the like. Further pockets of varying sizes are provided, with closure flaps, for housing various other fishing and convenience needs. Pocket closures are snaps, hook and loop fabric, or even zippers. The removably attached aprons provide for ease in loading and unloading items and also for selectively carrying items.

Removably attached equipment aprons also provide for interchanging a plurality of aprons for various usages, even uses other than fishing. Also, in further embodiments, replacement aprons are fitted with loops for carrying fishing poles, tubes for poles, loops for landing nets, or even drink holders. Further embodiments include drains for the cooler wells, as well as attachments for aerating any live wells. The portable cooler and tackle box is to be manufactured in a variety of colors. In other embodiments, the portable cooler and tackle box is comprised of multiple partitions within the cooler. The partitions are permanently a part of the interior or are comprised of removable tackle and storage boxes that define their own partitions. Partitions comprise separate bait wells, fish wells, and food and beverage wells. Ideally, the removable boxes are covered with transparent plastic lids which are both hinged and removable. Plastic latches releasably lock lids closed. The part of the portable cooler and tackle box that remains accessible for cold storage is also removably and hingeably attached. On the underside of the cooler lid is a hollow for removably receiving a cold cartridge/pack. Such packs are of the typically sold, re-freezable variety. The lid, in another embodiment, has a pocket for receiving the cold pack. In still further embodiments, the portable cooler and tackle box is comprised of additional storage areas in the forms of drawer recessions, below the interior spaces allotted for interiorly fitted tackle boxes and items to be cooled. The drawer recession area is comprised of a plurality of slots for receiving typically sold tray tackle boxes. A further embodiment is comprised of permanent partitioned drawers. In the embodiment having slots, standard sizes of tackle boxes made by a number of manufacturers are utilized. In such embodiment, lips are provided at the lower slot openings such that tackle drawers must be slightly lifted for removal or partial removal. This ensures that the boxes do not unintentionally slide out. The body of the portable cooler and tackle box is preferably of plastic construction.

Further embodiments utilize other suitable composites. Handles on each end of the invention are flexible as well as removable. A varied embodiment utilizes hingeably foldable handles. Preferably wheels are provided on one end of the invention for aiding transportation. The body of the cooler is filled with an appropriate insulating material such as foam or the like. Additional embodiments are gas filled.

Thus has been broadly outlined the more important features of the portable cooler and tackle box so that the detailed description thereof that follows may be better understood and in order that the present contribution to the art may be better appreciated.

Numerous objects, features and advantages of the portable cooler and tackle box will be readily apparent to those of ordinary skill in the art upon reading the following detailed description of presently preferred, but nonetheless illustrative, embodiments of the portable cooler and tackle box when taken in conjunction with the accompanying drawings. In this respect, before explaining the current embodiments of the portable cooler and tackle box in detail, it is to be understood that the invention is not limited in its application to the details of construction and arrangements of the components set forth in the following description or illustration. The invention is capable of other embodiments and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the portable cooler and tackle box. It is therefore important that the claims be regarded as including such equivalent constructions insofar as they do not depart from the spirit and scope of the present invention.

These together with additional objects of the portable cooler and tackle box, along with various novel features that characterize the invention are particularly pointed out in the claims forming a part of this disclosure.

For better understanding of the portable cooler and tackle box, its operating advantages and specific objects attained by its uses, refer to the accompanying drawings and description.

DETAILED DESCRIPTION OF THE PREFERRED EMBODIMENT

With reference now to the drawings, and in particular FIGS. 1 through 5 thereof, the preferred embodiment of the portable cooler and tackle box employing the principles and concepts of the present invention and generally designated by the reference number 10 will be described.

Figure 1:
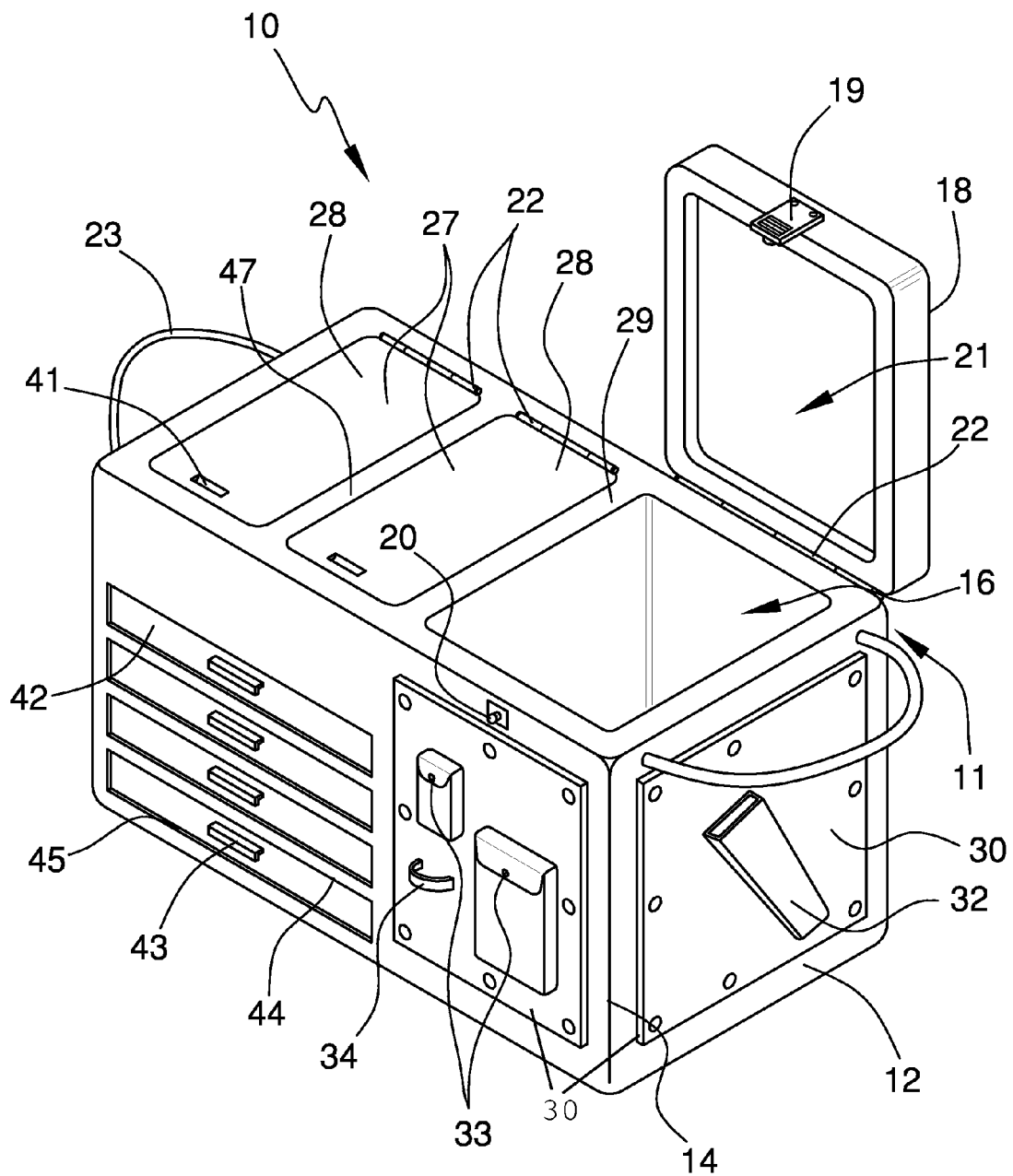
FIG. 1 is a perspective view of an embodiment of the portable cooler and tackle box.

Referring to FIG. 1, an embodiment of portable cooler and tackle box 10 comprises a main body 11 comprised of a bottom wall (not shown), first and second side walls 12, a back wall 13 (as in FIG. 2), and a front wall 14, the walls defining an interior 16. Body 11 is filled with insulating material (not shown). Cover 18 pivotally connects to top of back wall 13 at pivotal attachment 22 and selectively covers interior 16. Cover 18 is filled with insulation or gas (not shown). Recession 21 (FIGS. 1, 2, and 3) of cover 18 provides space for ice (not shown) or typical freeze cartridge (not shown). Flexible plastic female latch 19 releasably latches cover 18 to top of front wall 14 at male latch 20. On one side of interior 16 are compartments 27. Compartments 27 are bounded below by a horizontal partition (not shown) that extends between the first side wall 12, front wall 14, back wall 13. Compartments 27 are pivotally covered by compartment covers 28 and are divided by compartment dividing wall 47. Covers 28 are transparent. Below the horizontal partition are tray openings 44. Trays 42 removably slide within openings 44 via tray handles 43. Trays 42 fit horizontally within trays openings 44. Openings 44 are outwardly and downwardly bounded by lips 45 such that trays 42 must be slightly elevated above lips 45 to slide out of openings 44. Inadvertent opening of trays 42 is thereby negated.

Figure 2:
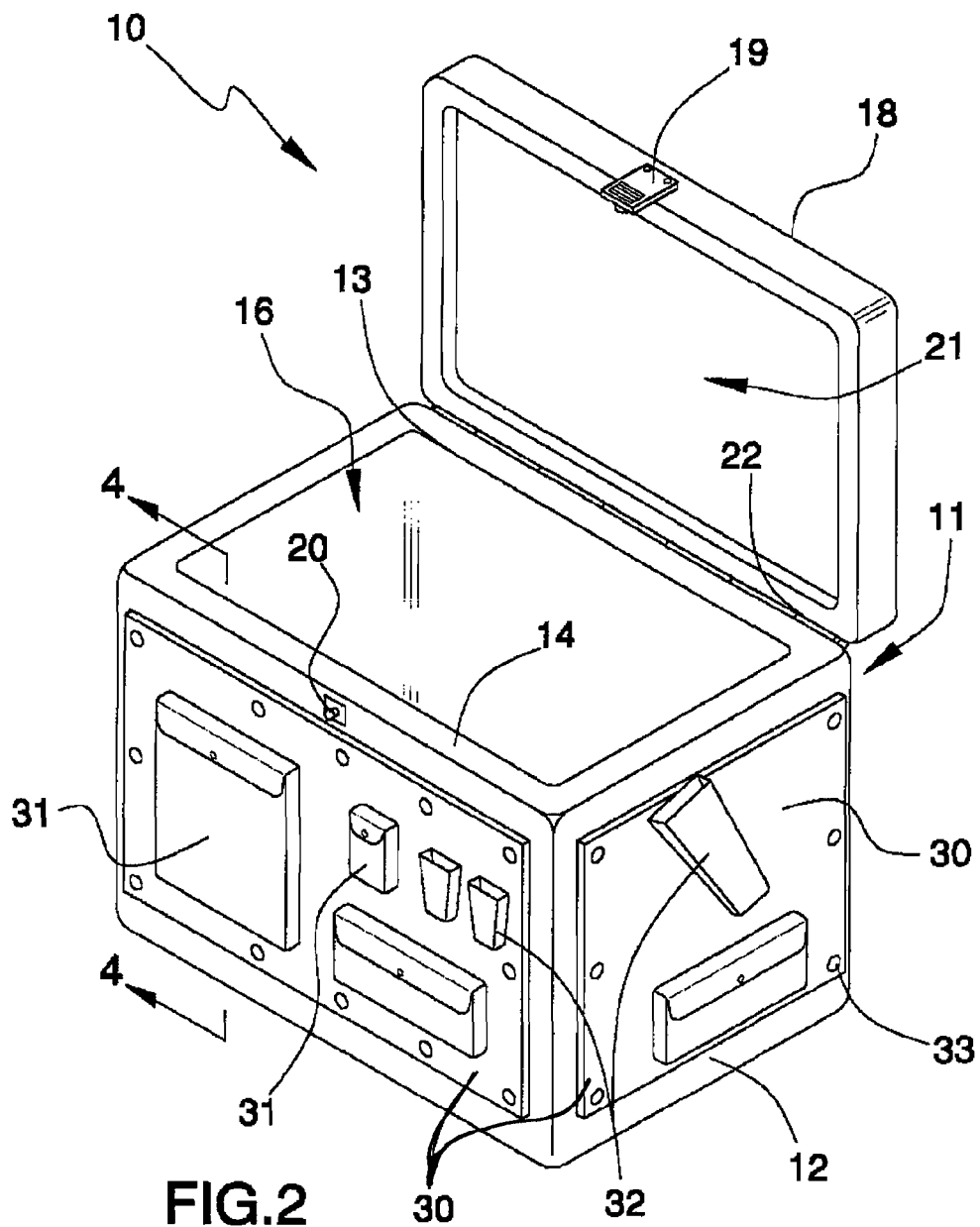
FIG. 2 is a perspective view of an alternative embodiment of the portable cooler and tackle box.
Figure 4:
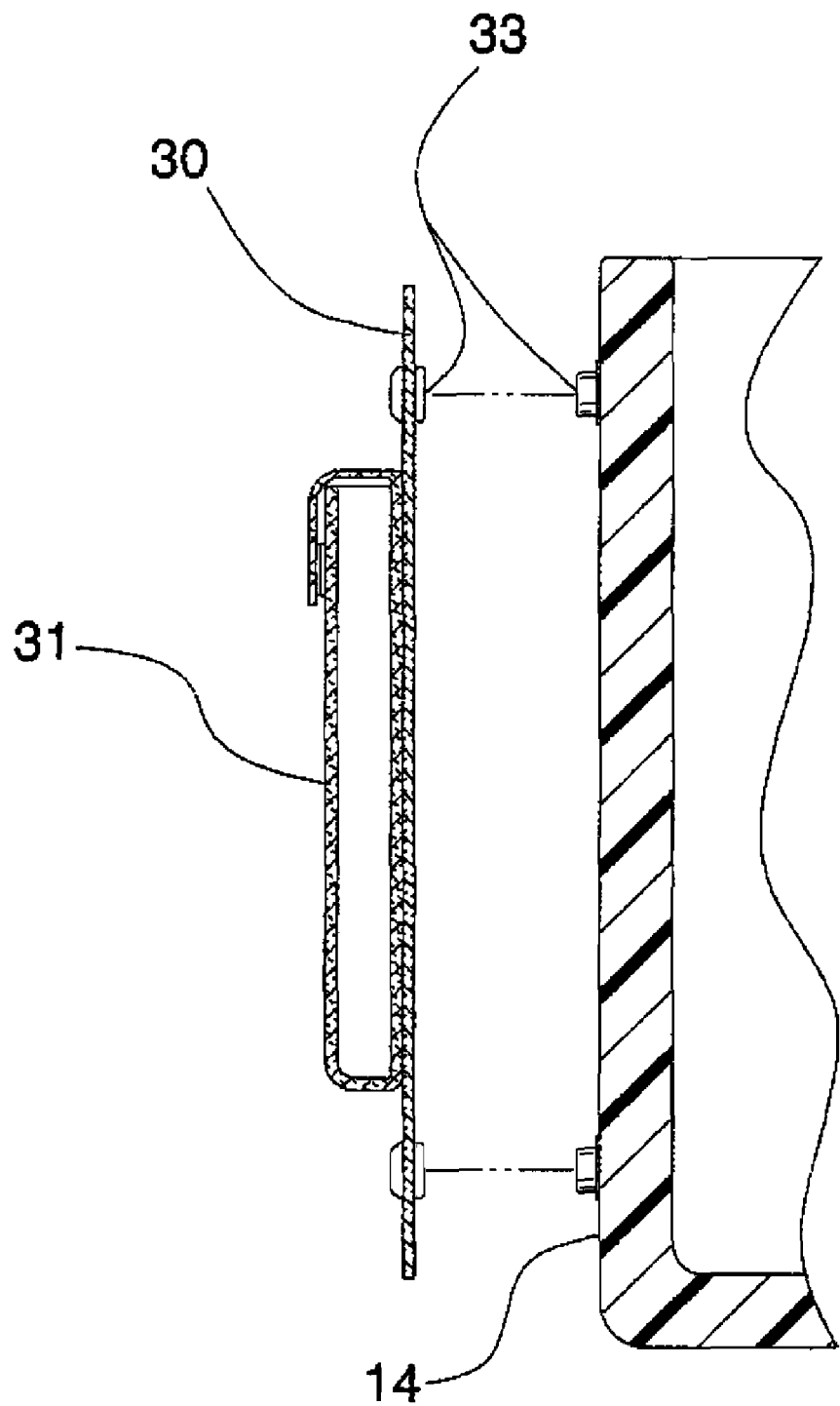
FIG. 4 is a side cutaway view of an apron and apron fastening means of the portable cooler and tackle box.

Aprons 30 are removably attached to exterior of side wall 12 and front wall 14 (FIGS. 1, 2 and 4). Aprons 30 approximate the size of front wall 14 and side walls 12. Aprons 30 are removably and selectively attached via a plurality of snaps 33.

Figure 5:
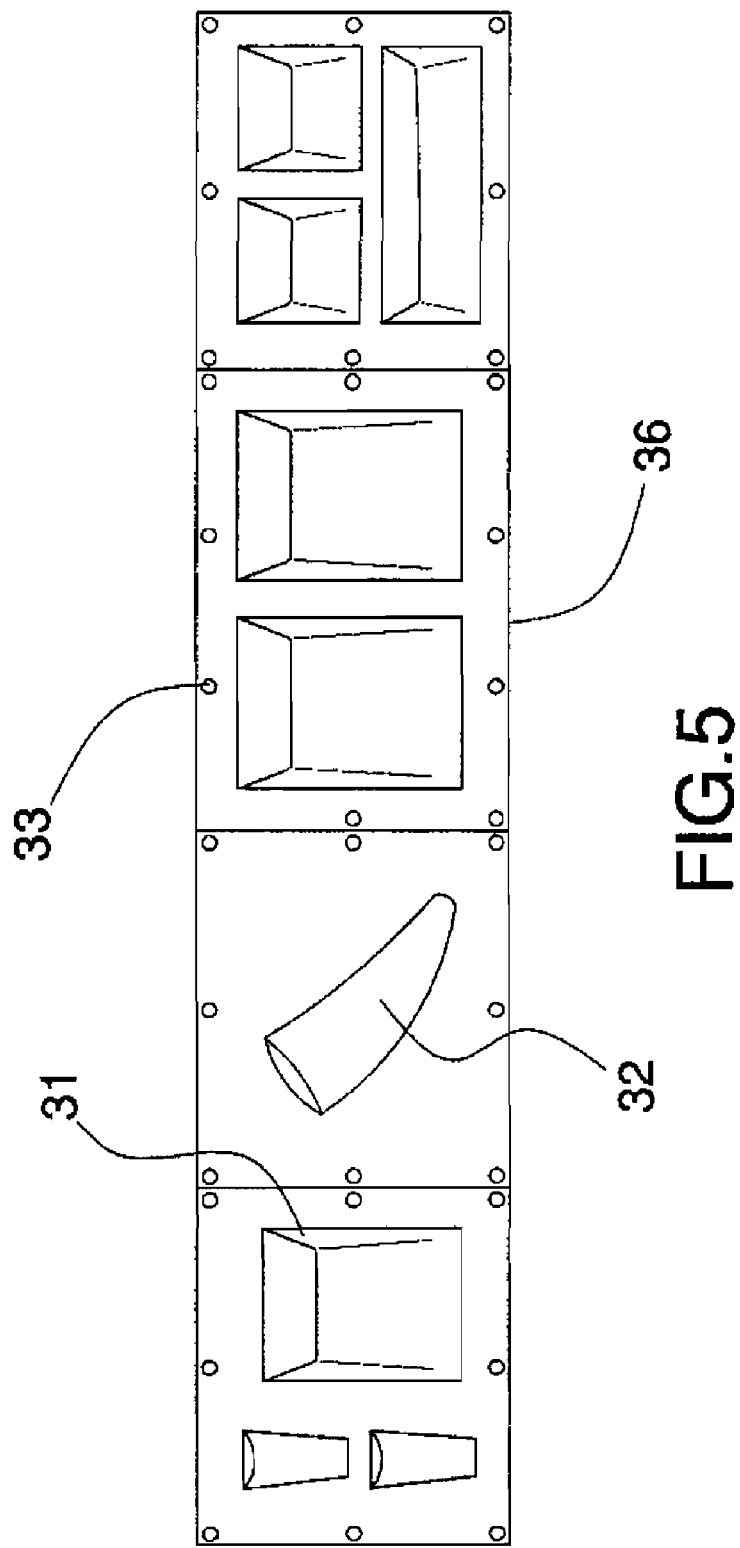
FIG. 5 is a frontal view of a continuous apron of the portable cooler and tackle box.

Aprons are fitted with a plurality of pockets 31 and pouches 32 and holders 34. Pockets are fitted with snaps 33 for secured closing. Referring to FIG. 5, continuous apron 36 illustrates a further apron embodiment.

Figure 3:
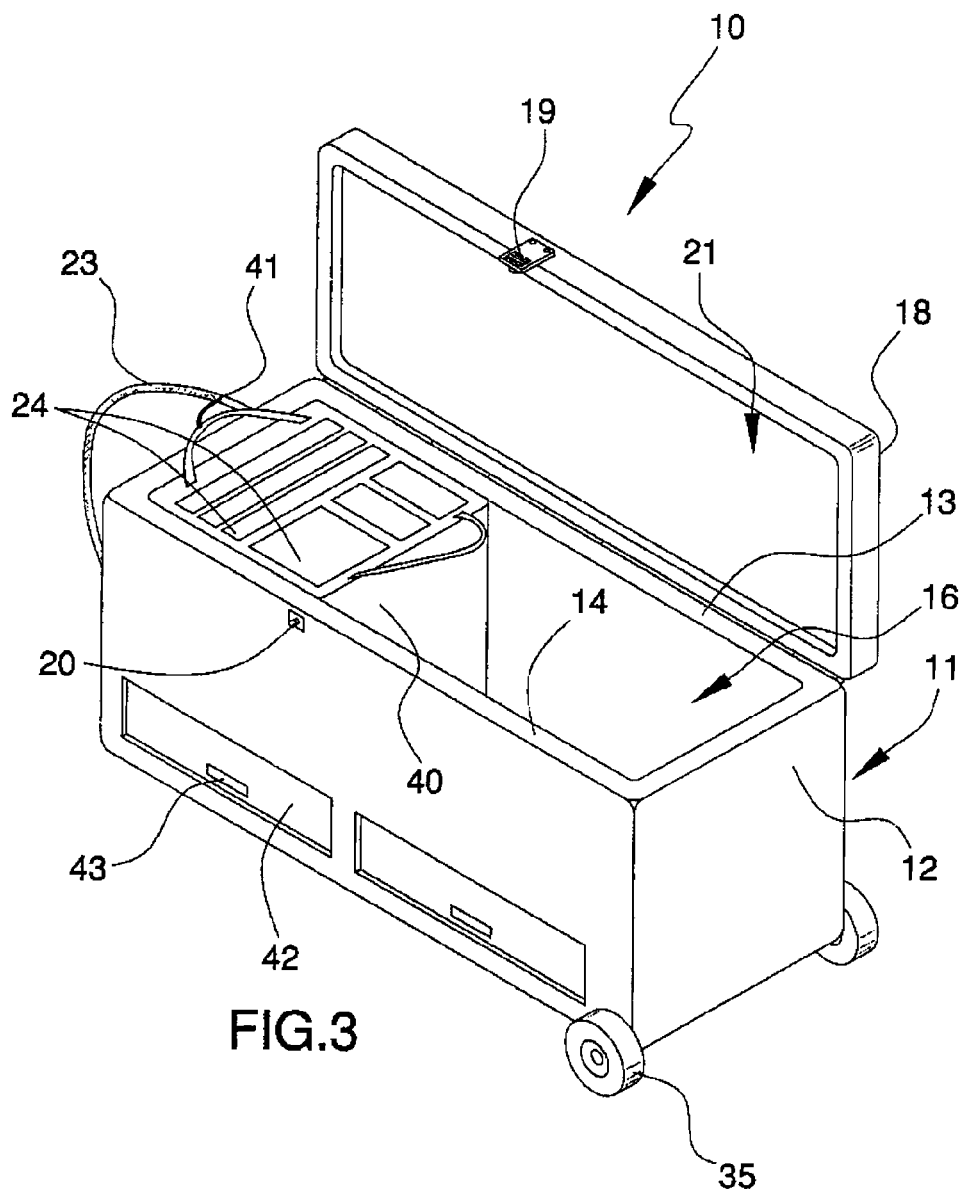
FIG. 3 is a perspective view of yet another embodiment of the portable cooler and tackle box.

Referring to FIG. 3, invention 10 is further comprised of removable compartment 40 within interior 16. Top edges of compartment 40 are affixed with handles 41. Compartment 40 is further comprised of storage bins 24 for holding fishing tackle (not shown) or other accessories (not shown). Wheels 35 aid in mobility of invention 10, as does handle 23 fitted to exterior of side wall 12.

Referring to FIG. 1, in use, interior 16 of invention 10 is filled with desired items (not shown). User (not shown) pulls flexible female 19 latch outward to disengage from male latch 20 to lift cover 18. Compartment covers 28 are lifted by compartment handles 41 for insertion of desired items such as fish (not shown), bait (not shown), ice or water (not shown) or other desired items. Covers 28 pivot about pivotal attachments 22. Covers 18 and 28 are closed to securely house items. User grasps tray handles 43 to lift trays above lips 45, then pulls trays horizontally outward for access to store further desired items. Trays 42 are then reinserted.

User optionally undoes snaps 33 by pulling outward on aprons 30, thereby releasing aprons 30 for ease of filling or emptying pockets 31 and pouches 32, or simply for removal of aprons 30 or apron 36. If undone, snaps 33 are then pressed for re-engagement of aprons 30 with front wall 14 and side wall 12. Handles 23 are utilized for transport of invention 10. Compartments, interior, pouches, and pockets are accessed as needed in the use of invention 10. Upon completion of use and transport of invention 10 back to desired storage, user may optionally empty invention 10 in reversal of initial use procedure.

Referring to FIG. 3, invention 10 is transported via handle 23 and wheels 35. Handle 23 is lifted, and then utilized to pull invention 10 along. Storage bins 24 are collectively housed and are lifted via handles 41 for removal or installation into interior 16.

With respect to the above description then, it is to be realized that the optimum dimensional relationships for the parts of the portable cooler and tackle box, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A portable cooler and tackle box comprising:
   a main body having a bottom wall, first and second side walls, a back wall, and a front wall, said walls defining an interior, said interior is divided into at least two compartments;
   insulating means for said main body;
   covering means for said interior, said covering means comprising a first cover being pivotally attached to an upper region of said back wall to selectively cover said interior;
   at least one removable apron for attaching to an outer surface of at least one of the side walls, back wall, or front wall, the at least one apron with pockets, holders, and pouches for holding accessories, the at least one apron comprising two aprons, one of said two aprons being attached to the outer surface of the front wall and the other of said two aprons being attached to the outer surface of the second sidewall;

apron attachment means for removably attaching said at least one apron to said main body, wherein said apron attachment means comprise snaps on the outer surface of the front wall, the outer surface of the second sidewall, and on the two aprons;

a horizontal partition wall within the main body, said horizontal partition wall extending between the first side wall, front wall, and back wall such that said horizontal partition wall divides a portion of said interior into an upper region above the horizontal partition wall and a lower region below the horizontal partition wall;

a plurality of trays exteriorly accessed and slidably contained within tray openings in said lower region, said tray openings extending through said front wall and into said interior, said trays fitting horizontally within said tray openings, each of said tray openings being bounded by a lip at the front wall which prevents horizontally outward movement of said trays past the front wall so as to prevent inadvertent opening of said trays, wherein said trays must be slightly elevated above said lips in order to slide the trays out of said tray openings and past the front wall; and a handle attached to the outer surface of each of said first and second sidewalls;

wherein said at least two compartments are located in said upper region and said covering means further comprises second and third covers which are pivotally attached to said main body to selectively cover said at least two compartments, and the other of said two aprons being attached to the second sidewall below the handle attached to the second sidewall.

2. The portable cooler and tackle box as claimed in claim 1 wherein said portable cooler and tackle box is provided in sizes from about 5 gallon to about 60 gallon capacity.

3. The portable cooler and tackle box as claimed in claim 2 wherein said at least two compartments are removable compartments.

4. The portable cooler and tackle box as claimed in claim 3 wherein said covering means further comprises a recession facing said interior of said main body, said recession for holding ice or freeze cartridges.

\* \* \* \* \*